(12) United States Patent
Yach et al.

(10) Patent No.: US 7,457,631 B2
(45) Date of Patent: Nov. 25, 2008

(54) APPARATUS, AND ASSOCIATED METHOD, FOR FACILITATING SYNCHRONIZATION OF DATABASES CONNECTED BY WAY OF A RADIO AIR INTERFACE

(75) Inventors: David Paul Yach, Waterloo (CA); Barry Warren Linkert, Petersburg (CA); Jie Zhu, Kitchener (CA); Salim Hayder Omar, Waterloo (CA); Piotr K Tysowski, Waterloo (CA); Albert Hecht-Enns, Waterloo (CA); Catherine Phillips, Waterloo (CA); Kathy Ann Pereira, Waterloo (CA)

(73) Assignee: Research In Motion Limited, Waterloo (CA)

( * ) Notice: Subject to any disclaimer, the term of this patent is extended or adjusted under 35 U.S.C. 154(b) by 598 days.

(21) Appl. No.: 10/775,820

(22) Filed: Feb. 10, 2004

(65) Prior Publication Data
US 2005/0176453 A1 Aug. 11, 2005

(51) Int. Cl.
*H04B 7/00* (2006.01)
*H04B 15/00* (2006.01)

(52) U.S. Cl. .......... 455/502; 455/433; 455/435.1; 709/216; 709/232; 709/246; 709/248

(58) Field of Classification Search .......... 455/558, 455/13.2, 502, 550.1, 566, 551, 517, 403, 455/436, 443, 455, 437, 434, 435.1, 440, 455/441, 446, 439, 442, 67.11; 709/230, 709/232, 203, 209, 216, 217, 224, 246, 248, 709/228; 707/1, 10, 100, 101, 201, 203
See application file for complete search history.

(56) References Cited

U.S. PATENT DOCUMENTS

| | | | | |
|---|---|---|---|---|
| 5,974,238 A | * | 10/1999 | Chase, Jr. | 709/248 |
| 6,052,735 A | * | 4/2000 | Ulrich et al. | 709/236 |
| 6,324,542 B1 | | 11/2001 | Wright, Jr. et al. | |
| 6,401,104 B1 | * | 6/2002 | LaRue et al. | 707/203 |
| 6,728,786 B2 | * | 4/2004 | Hawkins et al. | 709/248 |
| 6,810,405 B1 | * | 10/2004 | LaRue et al. | 707/201 |
| 6,829,622 B2 | * | 12/2004 | Beyda | 707/203 |
| 6,901,434 B1 | * | 5/2005 | Lunsford et al. | 709/216 |
| 6,925,477 B1 | * | 8/2005 | Champagne et al. | 707/203 |
| 6,968,209 B1 | * | 11/2005 | Ahlgren et al. | 455/558 |

(Continued)

FOREIGN PATENT DOCUMENTS

EP 917077 A2 * 11/1998

(Continued)

OTHER PUBLICATIONS

Praveen Seshadri, Phil Garrett; SQLServer For Windows CE-A Database Engine for Mobile and Embedded Platforms; Feb. 29, 2000.

*Primary Examiner*—Sujatha Sharma

(57) ABSTRACT

Apparatus, and an associated method, for facilitating synchronization of databases connected by way of a radio air interface. Changes to a data record embodied at the network part are detected by a detector. A mapping is performed by a mapper, and a synchronization request is generated by a synchronization request generator. The synchronization request is filtered by a filter, and converted into form to permit its efficient communication upon the radio air interface to a mobile node pursuant to a synchronization session.

18 Claims, 6 Drawing Sheets

U.S. PATENT DOCUMENTS

| | | | |
|---|---|---|---|
| 7,013,315 B1 * | 3/2006 | Boothby | 707/203 |
| 7,127,509 B2 * | 10/2006 | Wu | 709/224 |
| 7,213,039 B2 * | 5/2007 | Ramanujam et al. | 707/203 |
| 2002/0029214 A1 * | 3/2002 | Yianilos et al. | 707/7 |
| 2002/0059256 A1 | 5/2002 | Halim et al. | |

FOREIGN PATENT DOCUMENTS

| | | | |
|---|---|---|---|
| WO | WO 02-054236 A2 | 7/2002 | |

* cited by examiner

```
<Mapping>
<Ver>1. 0</Ver>
<DataSource>Exchange</DataSource>
<Target type="Address Book" configurable="yes" >
    <FirstName    map="FName"     display="First Name" />
    <MiddleName   map="MName"     display="Middle Initial" />
    <LastName     map="LName"     display="Last Name" />
    <JobTitle     map=""          display="Job Title" />
    <Company      map="Company"   display="CompanyName" />
    <EMail1       map="EMail1"    display="EMail Address" />
    <Home         map=""          display="Home Phone" />
    <Work         map="Work"      display="Phone" />
    <Body         map="Notes"     display="Body"/>
    <Birthday     map=""          display="Birthday"/>
    <CarPhone     map=""          display="Car Phone" />
    <Department   map=""          display="Department" />
</Target>
</Mapping>
```

```
<RimSync>
<Ver>1. 0</Ver>
<Sync>
  <User>John Smith Distinguished Name</User>
  <Target type="Address Book" >    <!-Device database -->
     <Update>
        <CmdID>1</CmdID>
        <GUID>823482348234834</GUID>
        <FirstName>John</FirstName>
        <MiddleName>Willey</MiddleName>
        <LastName>Smith</LastName>
        <JobTitle>MarketingMgr. </JobTitle>
        <Company>XYZ Ltd. </Company>
        <Email1>jw@xyz.net</Email1>
        <Home>888-9654</Home>
        <Work>888-7465</Work>
        <Body>Responsible for Inside Sales</Body>
        <Department>Sales & Marketing</Department>
     </Update>
  </Target>
</Sync>
</RimSync>
```

```
<Record>
   <FName>John</FName>
   <MName>Willey</MName>
   <LName>Smith</LName>
   <Company>XYZ Ltd. </Company>
   <EMail1>jw@xyz.net</EMail1>
   <Work>888-7465</Work>
   <Notes>Responsible for Inside Sales</Notes>
</Record>
```

```
<Mapping>
  <Ver>1. 0</Ver>
  <DataSource>Handheld</DataSource>
  <Target type="Address Book" ver"1.0">
      <Salutation   map="55"  key="No"  display="Salutation" />
      <FName        map="32"  key="Yes" display="First Name" />
      <MName        map="129" key="Yes" display="Middle Name" />
      <LName        map="128" key="Yes" display="Last Name" />
      <Title        map="42"  key="No"  display="Job Title" />
      <Company      map="33"  key="Yes" display="Company"/>
      <Email1       map="1"   key="No"  display="Email 1" />
      <Address1     map="35"  key="No"  display="Address 1" />
      <City         map="38"  key="No"  display="City"/>
      <State        map="39"  key="No"  display="State/Prov"/>
      <Country      map="41"  key="No"  display="Country"/>
      <Zip          map="40"  key="No"  display="Zip Code" />
      <Fax          map="3"   key="No"  display="Fax"/>
      <Work         map="6"   key="No"  display="Work Phone" />
      <Home         map="7"   key="No"  display="Home Phone" />
      <Web          map="54"  key="No"  display="Web URL" />
      <Mobile       map="8"   key="No"  display="Cell Phone" />
      <Pager        map="9"   key="No"  display="Pager"/>
      <PIN          map="10"  key="No"  display="PIN"/>
      <Notes        map="64"  key="No"  display="Notes"/>
      <UserDefine1  map="65"  key="No"  display="User Def 1" />
      <UserDefine2  map="66"  key="No"  display="User Def 2" />
      <UserDefine3  map="67"  key="No"  display="User Def 3" />
      <UserDefine4  map="68"  key="No"  display="User Def 4" />
  </Target>
</Mapping>
```

```
[0x08][0x0A]                         <- Use Data Source object
   [0x10][0x08]    "Exchange"        <- Data source name
[0x09][0x0E]                         <- Use Database Object
   [0x20][0x0C]    "Address Book"    <- Database name.
[0x70][0x01] 1                       <- CmID
[0x03][0x16]                         <- Update command
   [0x01][0x04] 1234                 <- Record UID
   [0x02][0x14]                      <- Record Fields
      [0x33][0x08]    "XYZ Ltd."     <- Company field changed
      [0x06][0x08]    "888-1234"     <- Phone number changed
```

APPARATUS, AND ASSOCIATED METHOD, FOR FACILITATING SYNCHRONIZATION OF DATABASES CONNECTED BY WAY OF A RADIO AIR INTERFACE

The present invention relates generally to a manner by which to facilitate synchronization of data stored at a network database with corresponding data stored at a mobile node by way of a radio air interface of a radio communication system. More particularly, the present invention relates to apparatus, and an associated method by which to initiate synchronization of a network part of the radio communication system upon detection of a change to a data record of the data stored at the network database.

Upon detection of a change to a data record, a mapping is performed to define an association between the fields of the data record of the network database with fields of a corresponding data record maintained at the mobile node. A synchronization request is generated that includes the mapped information together with the network values of the fields of the data record upon which the mapping is performed. The values contained in the synchronization request are converted into an encoded format and selectably communicated to the mobile node pursuant to a synchronization session. The information required pursuant to the synchronization session is contained in the synchronization request, and the information is converted into a form to facilitate its communication upon the radio air interface in an efficient manner.

BACKGROUND OF THE INVENTION

Communication systems are regularly utilized in modern society through which to communicate data pursuant to the effectuation of a communication service. Data communicated pursuant to the effectuation of the communication service is originated at a communication source and is sent upon a communication channel for delivery to a communication target.

At a minimum, a communication system is formed of a first communication station that forms, or is coupled to, the communication source and a second communication station that is coupled to, or forms, the communication target. The communication stations are connected by way of a communication channel upon which the data is communicated by the first communication station to the second communication station. The first communication station that sends the data is sometimes referred to as a sending station. And, the second communication station that receives the data is sometimes referred to as a receiving station.

A communication-station pair in which each of the communication stations thereof forms both a sending station and a receiving station permits two-way communication services to be effectuated. That is to say, the communication stations are each capable of both sending and receiving data. Telephonic communications and communications in which closed-loop feedback is utilized are exemplary of communication services that include communication stations capable of both sending and receiving data.

Successive generations of communication systems have been developed and deployed to take advantage of technological advancements. Technological advancements, when applied to communication systems, are generally applied in manners to increase the data throughput rates at which the data is communicated, the accuracy by which the data is communicated, or the manner by which the data can be communicated.

An exemplary type of communication system is a radio communication system. In a radio communication system, the communication channels upon which data is communicated are defined upon radio links that extend between the communication stations of the radio communication system. Wireline connections, conventionally required in a wireline communication system through which to connect the communication stations, and upon which communication channels are defined, are obviated. Various advantages are provided to radio communication systems in which the need for such wireline connections is obviated. In addition to reduced infrastructure costs associated with the installation of a radio communication system, a radio communication system also provides for communication mobility. That is to say, one, or more, of the communication stations between which data is communicated pursuant to effectuation of a communication service is permitted movement.

Technological advancements related to processing technologies also are applied to communication systems. Technological advancements that pertain to processing technologies, when applied to communication systems, generally permit increased amounts of data to be processed in decreased amounts of time. Modern data processing techniques permit significant amounts of data to be stored and operated upon. Radio communication systems, as well as other types of communication systems, are regularly utilized by which to transport the data that is to be stored and operated upon through the use of data processing techniques.

Various types of communication devices have been developed that perform, in addition to performance of communication functions, various data processing operations. Additional communication services and associated applications shall likely continue to be developed that require communication devices to implement new data processing and new communication technologies.

Personal digital assistants (PDAs) are exemplary of communication devices that are available, and regularly utilized by which to effectuate communication services and to operate upon data. The devices are typically of relatively small dimensions, i.e., of dimensions that permit their hand carriage by a user.

Typically, personal digital assistants contain storage locations for storing data forming one or more databases. During operation of a personal digital assistant, the user of the personal digital assistant, or analogous such processing device, selectably retrieves the data stored at the databases maintained thereat. The data that forms the database is usually formatted to form, e.g., data records formed of one or more data fields. The data fields are populated with data that is stored at the database. Upon selection of particular data records, or fields thereof, by the user, the data is retrieved from the database and displayed, or otherwise made available, to the user. Processing operations, such as sorting operations are also selectably initiated by the user. Sorting, or other processing, of the data is performable. Also, the user of the device is able further selectably to change, add to, or delete from, the data stored at the database.

To ensure that the data stored at the portable device is not irretrievably lost in the event of malfunction of, or other problem with, the portable device, the data is copied, i.e., backed up, at a separate storage device. Once suitably backed up, the back up copy is retrieved, if necessary, to access the data or to re-store the data at the portable device. Conventional personal digital assistants, for instance, sometimes provide for the back up of the data maintained at the databases thereof at a computer workstation or analogous device that contains a storage memory depository. Back up operations by which to store a back up copy of a database maintained at the personal digital assistant conventionally utilizes a fixed cable to which a wireline connection is formed between the portable device and the device that contains the storage memory depository. Once the data is stored at the storage memory depository, the back up copy is available for subsequent access thereto, if necessary.

The back up copy of the database is a complete copy of the data stored at the portable device only for so long as the data maintained at the respective devices are not altered. When, as is conventionally the case, asynchronous changes to the database maintained at the portable device or at the back up copy causes the data at the respective locations no longer to be in match with one another. And, therefore, any asynchronous change to the database or its back up copy results in data content dissimilarities therebetween.

In order to place the database maintained at the portable device, and its copy, back into match with each other, the database and its back up copy must be synchronized. Synchronization operations are performed, for instance, during subsequent back up operations, at timed intervals, or upon detection of a change to a data record at either of the locations. During synchronization operations, data stored at the respective locations are compared together. And, responsive to the comparisons, data found to be out-of-match with one another is identified. Appropriate change to the data is then effectuated to place the data back in match with one another.

Some portable devices make use of a radio air interface by which, amongst other things, to back up and synchronize data stored at the databases. Data back up operations and data synchronization operations that are performed by way of a radio air interface are, however, more problematical than operations performed by way of a conventional wireline connection. Bandwidth limitations, for instance, limit the communication capacity that can be made available for the back up and synchronization operations. And, the use of conventional techniques, predicated upon the use of wireline connections rather than a radio air interface, as a general rule, are prohibitively bandwidth consumptive when applied to a system in which such operations are performed by way of a radio air interface. Additionally, the information that is transported upon the radio air interface must be carefully selected so that the information needed to perform the synchronization operation can be efficiently effectuated.

Any manner by which to provide better for the back up and synchronization of data by way of a radio air interface would therefore be advantageous.

It is in light of this background information related to synchronization of data contents of databases by way of a radio air interface that the significant improvements of the present invention have evolved.

SUMMARY OF THE INVENTION

The present invention, accordingly, advantageously provides apparatus, and an associated method, by which to facilitate synchronization of data stored at a network database with corresponding data stored at a mobile node by way of a radio air interface of a radio communication system.

Through operation of an embodiment of the present invention, a manner is provided by which to initiate synchronization at a network part of the radio communication system upon detection of the change to a data record of the data stored at the network database.

The information required pursuant to the synchronization session is contained in a synchronization request, and the information is converted into a form to facilitate its communication upon the radio air interface in an efficient manner.

In one aspect of the present invention, detection is made at the network part of a change to a data record of a network database copy. Responsive to the detection, a mapping is performed at the network part to define an association between the fields of the data record at which the change is detected at the network database copy with fields of a corresponding data record maintained at the mobile node.

Once the mapping is performed, a synchronization request is generated. The synchronization request includes the mapped information formed pursuant to the mapping operations. The synchronization request also includes network values of the fields of the data record upon which the mapping is performed.

The values contained in the synchronization request are converted into an encoded format, suitable for communication upon the radio air interface pursuant to a synchronization session by which to synchronize the data contained in the data records of the respective database copies. By converting the data contained in the synchronization request into a form permitting its efficient communication upon the radio air interface, the communication resources required to be allocated upon the radio air interface to effectuate a synchronization are minimized.

In another aspect of the present invention, the network database copies are managed by personal information manager (PIM) connector entities. When, for instance, a Microsoft Exchange™ exchange database copy is embodied at the network part, an Exchange™, personal information manager connector entity is associated therewith. The Exchange PIM connector entity operates, amongst other things, to detect to any data record of the Exchange database copy with which the PIM connector entity is associated. When a change is made to any field of a data record of the associated database, detection is made at the PIM connector entity. Responsive thereto, a mapping is performed at the PIM connector entity to form a map associating the fields of the data record at which the change is detected and corresponding fields of a corresponding data record embodied at the corresponding database at the mobile node.

The personal information manager connector entity also forms a synchronization request and populates the synchronization request with the map that is formed. The information of the map that is populated into the synchronization request includes the identities of the fields, defined at the data record of the network database copy as well as, also, the field identities of the mobile database copy. The values of the data fields of the network database copy also populate the synchronization request generated by the personal information manager connector entity.

The synchronization request generated by the personal information manager connector entity is delivered to a synchronization server. The synchronization server, responsive to the delivery thereto of the request, converts the values of the fields of the data record contained in the request out of a first, e.g., XML (Extensible Mark-up Language) and into a second form that facilitates communication pursuant to a synchronization session. Namely, the format is converted into a tag-length format, free of null terminators.

Determinations are made as to what fields of the data record contained in the synchronization request are of changed values. Fields, other than the fields that exhibit changed information, need not be communicated pursuant to a synchronization session and, hence, need not be converted into the tag length format.

The synchronization request is generated upon detection of change to any data field of any data record of the database. The synchronization request contains all information necessary to perform a synchronization with a corresponding data record of a database of a mobile node. The information is converted into non-redundant form to place the data in form for efficient communication upon a radio air interface extending to the mobile node.

In these and other aspects, therefore, apparatus, and an associated method, is provided for a radio communication system having a network part at which a network copy database is maintained and a mobile node at which a mobile copy database is maintained. Synchronization of data stored at the network copy database with data stored at the mobile copy database is facilitated. A mapper is embodied at the network part. The mapper selectably operates to form a map between fields of a data record of a network copy database and fields of the mobile copy database. The network copy database has a network schema, and the mobile copy database has a mobile schema. The map indexes together the fields of the data record of the network copy database with the fields of the corresponding data record of the mobile copy database. The mapper forms the map upon detection of change to the data record of the network copy database.

A more complete appreciation of the present invention and the scope thereof can be obtained from the accompanying drawings that are briefly summarized below, the following detailed description of the presently-preferred embodiments of the invention, and the appended claims.

BRIEF DESCRIPTION OF THE DRAWINGS

FIG. 2 illustrates a representation of an exemplary default mapping scheme performed during operation of an embodiment of the present invention.

FIG. 3 illustrates a representation, similar to that shown in FIG. 2, but here showing an XML (Extensible Mark-up Language) Synchronization request, also generated during exemplary operation of an embodiment of the present invention.

FIG. 4 illustrates a representation, similar to those in FIGS. 2-3, but here representative of the exemplary synchronization request shown in FIG. 3 subsequent to device normalization and filtering performed thereupon.

FIG. 5 illustrates a representation, similar to those shown in FIGS. 2-4, but here representative of an exemplary tag length encoded message formed pursuant to exemplary operation of an embodiment of the present invention.

DETAILED DESCRIPTION

Figure 1:
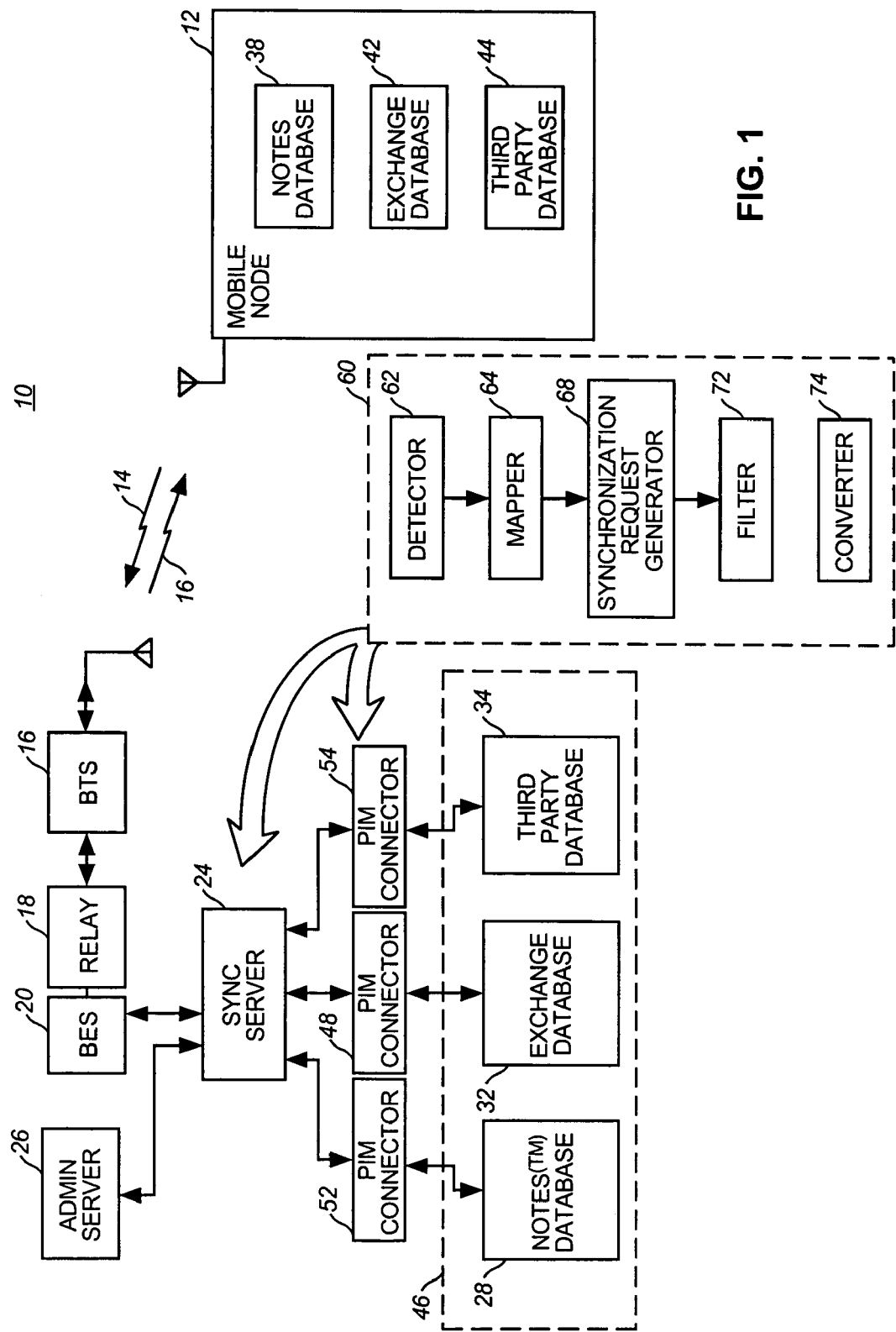
FIG. 1 illustrates a functional block diagram of a communication system in which an embodiment of the present invention is operable.

Referring first to FIG. 1, a radio communication system is shown generally at 10. The communication system provides for radio communications with a mobile node, of which a representative mobile node 12 is shown in the Figure. During operation, communications are effectuated between a fixed network part of the communication system and the mobile node by way of a radio air interface.

Through the communication of data between the mobile node and the network part of the communication system, a communication service is effectuable. Two-way communication of data is performed pursuant to various of such communication services. An up-link channel is defined upon a radio up-link of the radio air interface, and data sourced at the mobile node is communicated thereon for delivery to the network part of the communication system. Analogously, a down-link channel is defined upon a radio down-link of the radio air interface. The arrows 14 and 16 are representative of the up-link and the down-link, respectively, of the radio air interface.

The network part of the communication system includes fixed-site equipment. A base transceiver station 16 transceives data with the mobile node. A coverage area, sometimes referred to as a cell, is defined by the base transceiver station. The base transceiver station generally is able to detect data communicated by the mobile node when the mobile node is positioned within the area encompassed by the cell. And, the mobile node, generally, is able to detect data communicated by the base transceiver station upon the down-link channel thereto.

While not separately shown, the network part of the communication system includes a plurality of base transceiver stations defining partially overlapping coverage areas. The mobility permitted of the mobile node permits that mobile node to be positioned, at successive times, at different ones of the cells, defined by different ones of the base transceiver stations. Thereby, effectuation of a communication service can continue uninterrupted as the mobile node travels throughout successive ones of the cells defined in the communication system.

The base transceiver station is coupled to a relay device 18 that also forms a portion of the network part of the communication system, and the relay device is coupled to a connectivity server. The BES, in turn, is coupled to a synchronization (SYNC) server 24. The synchronization server and the relay device are functionally represented as separate functional entities. The functions performed by the separate functional entities are, in one implementation, carried out by a single physical entity, i.e., upon a common device or platform.

An administration (Admin) server 26 is coupled to the synchronization server and also forms a portion of the network part of the communication system. The administration server provides administrative services during operation of the communication system. Administrative control, for instance, over operation of the synchronization server is provided through operation of the administration server.

Network based databases are functionally coupled to, or embodied at, the synchronization server. The three databases are exemplary. Other numbers, and other types, of databases can also be embodied at, or coupled to, the synchronization server. A first database 28, a Lotus™ Notes database, is embodied at the network part of the communication system. Similarly, a second database 32, an Exchange™ database is also embodied at the network part of the communication system. And, a third database 34, is also embodied at the network part of the communication system. The third database here forms a third party database. The databases are maintained, here, at a database server 46.

Each of the databases 28, 32, and 34 are formed of a plurality of data records. And, each of the data records of the respective databases is formed of one or more data fields. Selected ones of the data fields of the data records form key fields. The data fields of the data records are selectably populated with values that together define the values of the databases.

Corresponding databases, that is, databases that correspond with the databases embodied at the network part of the communication system are also embodied at the mobile node. Here, a first database 38 is embodied at the mobile node that is associated with the database 28. The database 38 forms a Lotus Notes™ database, and the databases 28 and 38 are copies of one another. A second database 42, here an Exchange™ database is associated with the database 32. The databases 32 and 42 are copies of one another. And, the mobile node includes a third database 44. The database 44 is a third party database that corresponds with the database 34. The databases 34 and 44 are copies of one another.

During operation of the communication system, any of the databases, the databases embodied at the mobile node as well as the databases embodied at the network part, are asynchronously updateable. When a database is asynchronously updated, the other database associated therewith no longer remains a true copy of the database that has been asynchronously updated. Updating of a database includes any change to any data field of any data record thereof.

Subsequent to an asynchronous change to a database, the database pairs are placed back in match with one another through operation of a synchronization procedure or process. In a synchronization process, performed during a synchronization session, values of data stored in the respective databases of a database pair are compared. If the comparisons indicate that the data of the respective databases are out of match with one another, the data at one, or the other, of the databases is altered, thereby to bring the databases back in match with one another.

The portions of the up-link and down-link that are available for allocation for use pursuant to a synchronization session is limited. When the communication resources of the radio air interface are allocated to perform a synchronization procedure, the allocated bandwidth on the radio air interface is unavailable for use to effectuate other types of communication services. Operation of an embodiment of an embodiment of the present invention facilitates minimization of the bandwidth requirements needed of the radio air interface to perform a synchronization session while also promptly initiating a synchronization session at the network part when changes made to a data record of a database embodied thereat.

The databases 28, 32, and 34 are, in the exemplary implementation, embodied at a database server 46. And, the database server is coupled to the synchronization server by way of personal information manager (PIM) connectors, here corresponding in number with the separate databases embodied at the database server. Here, therefore, an Exchange™ connector 48, a Notes™ connector 52, and a third party connector 54 are separately shown. The connectors 48-54 form interfaces between the server 46 at which the databases are embodied and the synchronization server.

The network part includes apparatus 60 of an embodiment of the present invention. The apparatus 60 is formed of functional entities that are implemented in any desired manner, such as by algorithms executable by processing circuitry. In the exemplary implementation, the entities of the apparatus are distributed across the personal information management connectors and the synchronization server. In other implementations, the apparatus is embodied at a single physical device or is located elsewhere.

The apparatus 60 of the exemplary implementation includes portions embodied at a personal information manager connector, and a portion embodied at the synchronization server. The elements of the apparatus 60 are embodied at one or all of the PIM connectors, such as at the Exchange PIM connector 48. The functional entities shown to be embodied at the connector 48 are also formed at the other connectors, here the connectors 52 and 54.

The apparatus includes a detector 62 that operates to detect a change to any field of a data record forming part of an associated database. The detector 62, e.g., embodied at the Exchange connector 48 detects changes to any field of any data record of the Exchange database 28.

Upon detection by the detector of a change to the database, the detector forms an indication of the change, and the indication is provided to a mapper 64. The mapper is also, e.g., embodied at the connector. The mapper operates to map the fields of the data record of the database 28 with corresponding fields of the database 38 embodied at the mobile node. And, indications of the map, once formed, are provided to a synchronization request generator 68. The synchronization request generator operates to generate a synchronization request responsive to the application of the map information thereto. The synchronization request generator is, in the exemplary implementation, embodied at the connector. The synchronization request generator generates a synchronization request that is provided to the synchronization server.

The synchronization server includes a filter 72 that filters information contained in the synchronization request. Amongst the information that is filtered out of the synchronization request is information of a field of the data record embodied at the network database fails to have a corresponding field at the database of the mobile node. Once the request is filtered by the filter, the filtered request is provided to a converter 74. A converter is also embodied at the synchronization server in the exemplary implementation. The converter operates to convert the filtered synchronization request provided thereto and to place the information contained in the synchronization request into efficient form for its subsequent communication upon the radio air interface to the mobile node pursuant to a synchronization session.

Thereby, because a change to a data record of the database is immediately detected, a synchronization session can correspondingly be speedily commenced. And, because the information is converted into a form to permit its communication in an efficient manner upon the radio air interface, the radio resources required of the radio air interface to effectuate the synchronization session is minimal.

FIG. 2 illustrates a map, shown generally at 82, formed by the mapper 64 pursuant to its operation responsive to detection by the detector of a change to a data record of the database. The map 82 contains fields that map between the fields of the database 32 and its counterpart 42. In the exemplary representation shown in the Figure, the Exchange connector 48 supplies default mapping for synchronizing Lotus Notes™ contacts with the address book of the mobile node.

The XML tags, e.g., {First Name}, refer to fields used by the Exchange™ connector 48 and the map attributes, e.g., "Fname" that refer to the fields of the mobile node. In this representation, {First Name} tag maps to {Fname} on the mobile node. If the attribute is null, no mapping takes place between the database and the mobile node. The tags {Data Source} identify the data source of the connector and {target} identifies a common database between the data source and the mobile node. The display attribute is a displayable field should field mappings be configurable.

FIG. 3 illustrates an exemplary XML sync request 84 when an asynchronous change between the databases is detected. The {Cmd ID} tag is a monotonically increasing numeric value that identifies a particular record operation within a synchronization request. The {GUID} tag refers to a record entry identification in Exchange™. The {GUID} is used to map a record on Exchange to a corresponding record at the mobile node using the UID of the mobile node.

The synchronization request, once generated, is provided to the synchronization server. The server identifies the data source as "Exchange" and uses the accompanying XML field mapping, of which the mapping 82 is exemplary. Using this, or other analogous, field mapping, the synchronization server generates an XFL style sheet and applies field transformations to each record in the XML synchronization request.

FIG. 4 illustrates an exemplary result, shown generally at 86. Each record is in 'Device' normalized and any fields that are not mapped are filtered out by the filter 72. Information regarding data sources, databases, and record operations become synchronization commands for protocols used over the radio air interface, i.e., OTA protocols.

The synchronization server then uses the device connector to convert the normalized XML record to a tag length (TL) encoding. FIG. 5 illustrates a representation of the record, once TL encoded and is shown in the Figure generally at 90. The conversion uses an XML device mapping document to convert XML tags, such as {FName} to integer value equivalents, such as indicated in the Figure.

The integer value represented by the 'Map' attribute identifies a particular field within the address book record of the mobile node. Here, the {Fname} tag maps to an integer value of '32'. After the record is converted to TL encoding, the synchronization server further optimizes the record by checking field deltas from a previous synchronization session. Fields that have not changed are filtered out of the record, thereby further to reduce OTA traffic. Additionally, for every record that is successfully synchronized, the synchronization server stores a two-byte hash value for each of the fields.

Once the record has been filtered, the synchronization server builds a series of tag-length sync commands formed of data source, database, and record operations for each record. These synchronization commands make upon the complete synchronization package that is transmitted to the mobile node using a session oriented protocol.

Figures 6, 7:
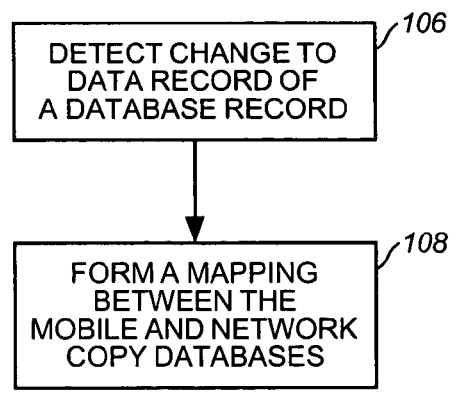
FIG. 6 illustrates a representation, similar to those shown in FIGS. 2-5, but here representative of a tag length encoded synchronization request that is sent upon a radio air interface during exemplary operation of an embodiment of the present invention.
FIG. 7 illustrates a flow chart representative of the method of operation of an embodiment of the present invention.

FIG. 6 illustrates an exemplary tag length encoded synchronization request, shown generally at 94, that is sent upon a downlink channel to the mobile node.

In the exemplary operation represented in these examples, the synchronization server detects two field changes, company and phone, from a previous synchronization session. All of the records that are involved in the synchronization process are stored in a pending database until a response is returned from the mobile node. Records that are successfully synchronized are removed from the pending database and a record history is then stored in the synchronization state database. Once delivered to the mobile node, the encoded packet is parsed, merged with existing record fields, and then converted to an address book object, whereat the record is updated in the address book database of the mobile node. A response is returned to the synchronization server that indicates the status of the packet and any error conditions resulting from the synchronization command.

FIG. 7 illustrates a method flow diagram, shown generally at 102, representative of the method of operation of an embodiment of the present invention. The method facilitates synchronization of data stored at a network copy database with data stored at a mobile copy database.

First, and as indicated by the block 106, a change to a data record of the network copy database is detected. Then, and as indicated by the block 108, a map is formed between the fields of the data record of the network copy database and fields of a corresponding data record of the mobile copy database. The mobile copy database has a mobile copy schema. The map indexes together the fields of the data record of the network copy database with the fields of the corresponding data record of the mobile copy database.

Through operation of the method of an embodiment of the present invention, a synchronization session is implementable upon detection of a change to a data record embodied at the network part of the communication system. Minimal communication resources upon the radio air interface are required to perform the synchronization session.

The previous descriptions are of preferred examples for implementing the invention, and the scope of the invention should not necessarily be limited by this description.

The invention claimed is:

1. Apparatus for a radio communication system comprised of a network part at which a network-copy database is maintained, a plurality of base transceiver stations (BTSs) coupled to the network part, each BTS of the plurality of BTSs defining a corresponding communication coverage area cell, within which at least one BTS provides data communications service to mobile nodes located therein and, a mobile node capable of being positioned in different cells at successive times and at which a mobile-copy database is maintained, said apparatus being located at the network part and facilitating synchronization of data stored at the network-copy database that changes relative to data stored in the mobile-copy database, the synchronization of data occurring through a relay device that couples the network part to a base transceiver station, the coverage area of which the mobile node is operating, said apparatus being located at the network part of the communication system and communicating with a plurality of base transceiver stations and a plurality of mobile nodes through said relay and comprising:

a mapper, selectably operable to form a map between fields of a data record of a network-copy database, the network-copy database having a network-copy schema and, fields of a corresponding data record of the mobile-copy database, the mobile-copy database having a mobile schema, the mobile-copy database schema being different than the network-copy database schema, the map indexing together the fields of the data record of the network-database with the fields of the corresponding data record of the mobile-copy database, said mapper forming the map upon detection of change to the data record of the network-copy database;

a synchronization request generator that receives the map, generates a synchronization request from the map, and which provides the synchronization request to a synchronization server, the synchronization server including a filter that filters out of a synchronization request to a mobile node, a request to update data for a field of a data record in the mobile-copy database for which a corresponding field of a corresponding data record does not also exist in the network-copy database;

wherein the synchronization server generates a synchronization request to be sent to a mobile node through a BTS in whose coverage area in which the mobile node is operating, the synchronization request including data for a record in the network-copy database that is to be copied into a record to be updated in the mobile node, the mobile node record to be updated being identified within the synchronization request by an integer generated from the map and identifying to both the mobile node and to the network part, the mobile node record to be updated, and wherein the mobile-copy database and the network-copy database are capable of being synchronized uninterruptedly as the mobile node travels through successive ones of communication coverage area cells.

2. The apparatus of claim 1 further comprising a detector embodied at the network part, coupled to the network-part database, and to said mapper, said detector for detecting the change to the data record of the network-copy database and for providing an indication of the change to said mapper.

3. The apparatus of claim 1, wherein the synchronization request generator is embodied at the network part and coupled to said mapper and to said synchronization server, said synchronization request generator generating a network-initiated synchronization request responsive to formation of the map by said mapper.

4. The apparatus of claim 3 wherein the synchronization request formed by said synchronization request generator comprises indicia associated with the map generated by said mapper.

5. The apparatus of claim 3 wherein the synchronization request formed by said synchronization request generator further comprises indicia associated with the data record of which change thereto is detected 6. The apparatus of claim 5 wherein the indicia associated with the data record and of which the synchronization request is further comprised comprises values of the data record.

7. The apparatus of claim 6 wherein the data record is formed of a first field and at least a second field and wherein the values of the data record comprised in the synchronization request formed by said synchronization request generator comprises values populating at least one of the first and at least second fields, respectively.

8. The apparatus of claim 7 wherein the values of the data record comprised in the synchronization request comprise values populating each of the first and at least second fields.

9. The apparatus of claim 5 wherein the fields of the data record of the network-copy database and mapped by said mapper are of a first number, wherein the fields of the corresponding data record of the mobile-copy database, the first number dissimilar with the second number.

10. The apparatus of claim 1 further comprising a converter embodied at the network part and coupled to said filter to receive the normalized mapped values formed thereat, said converter for converting the normalized mapped values into a radio air format, for communication to the mobile node pursuant to the synchronization of the data.

11. The apparatus of claim 10 wherein the radio air format into which said converter converts the normalized mapped values comprises a tag-length format.

12. The apparatus of claim 1 wherein said filter further filters map portions in which a field of the data record of the network copy database is absent a change.

13. A method of communicating in a radio communication system comprised of: a network part at which a network-copy database having a network schema is maintained, a plurality of base transceiver stations (BTSs) coupled to the network part, each BTS of the plurality of BTSs defining a corresponding communication coverage area cell, within which at least one BTS provides data communications service to mobile nodes located therein and, a mobile node capable of being positioned in different cells at successive times and at which a mobile copy database having a mobile copy schema, is maintained, said network-copy database being located at the network part, said network-copy database and said mobile copy schema being different from each other, said method for facilitating synchronization of data stored at the network copy database with data stored at the mobile copy database, the synchronization of data occurring through a relay device that couples the network part of the communication system to a base transceiver station, the coverage area of which the mobile node is operating, said method comprising at the network part:

detecting a change to a data record of the network copy database;

forming a map between fields of the data record of the network copy database having the network schema and fields of a corresponding data record of the mobile copy database, the mobile copy database having the mobile copy schema, the map indexing together the fields of the data record of the network copy database with the fields of the corresponding data record of the mobile copy database;

generating a synchronization request that is responsive to the map, the synchronization request identifying a data record in a mobile node to be updated and including the content of the record in the network-copy database to be copied into the mobile copy database;

filtering the synchronization request so that it does not attempt to update a data record in the mobile-node copy of the database that does not also exist in the network-copy database;

formatting the synchronization request to identify a record to be updated in the mobile node by including an integer generated from the map, the integer identifying to both a mobile node and to a network part, a record to be updated in a mobile node; and sending the synchronization request to a mobile node through a BTS in whose coverage area if which the mobile node is operating and wherein the mobile-copy database and the network-copy database is capable of being synchronized uninterruptedly as the mobile node travels through successive ones of communication coverage area cells.

14. The method of claim 13 further comprising the operation of generating a synchronization request at the network part, responsive to formation of the map formed during said operation of forming.

15. The method of claim 14 wherein the synchronization request generated during said operation of generating comprises indicia associated with the map formed during said operation of forming.

16. The method of claim 14 further comprising the operation of filtering, from the synchronization request, selected map portions thereof to form normalized mapped values.

17. The method of claim 16 further comprising the operation of converting the normalized mapped values into a radio air format.

18. The method of claim 17 further comprising the operation of sending selected normalized mapped values, once converted into the radio air format, to the mobile node pursuant to the synchronization therewith.

* * * * *